Jan. 24, 1939.   R. V. WALLACE   2,144,905
ATTACHMENT FOR HARVESTER REELS
Filed May 21, 1937   2 Sheets-Sheet 1
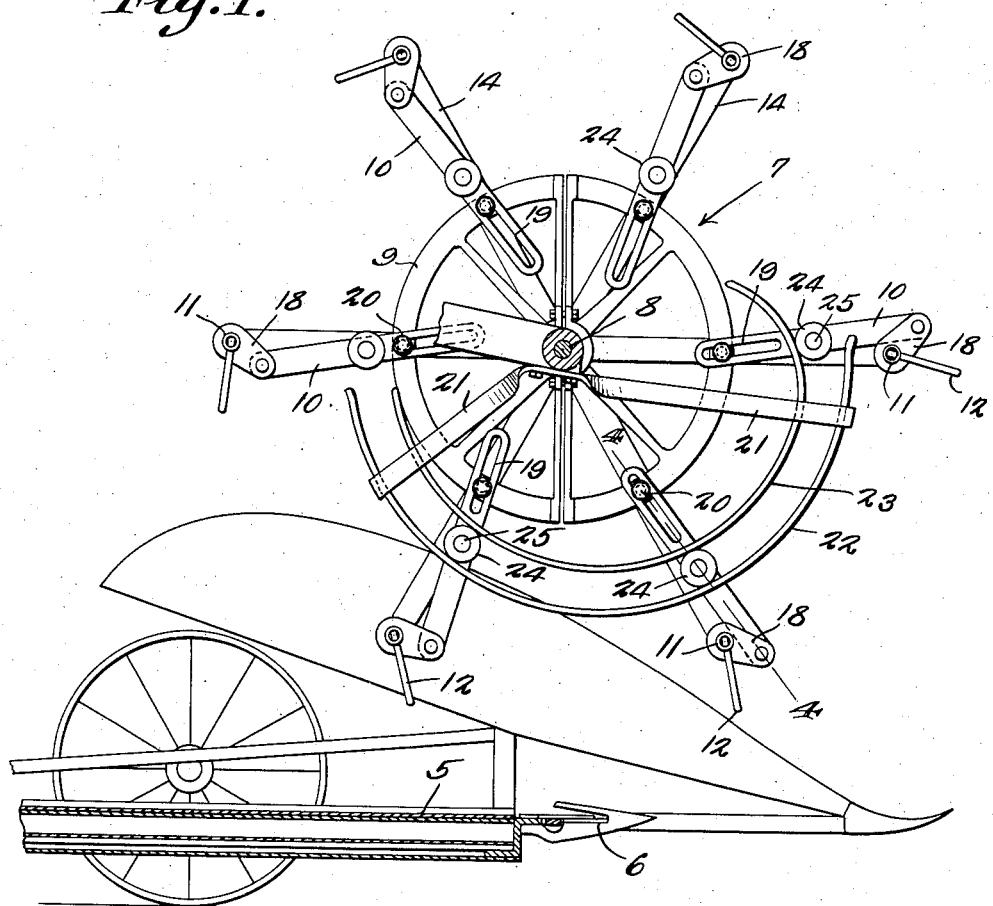
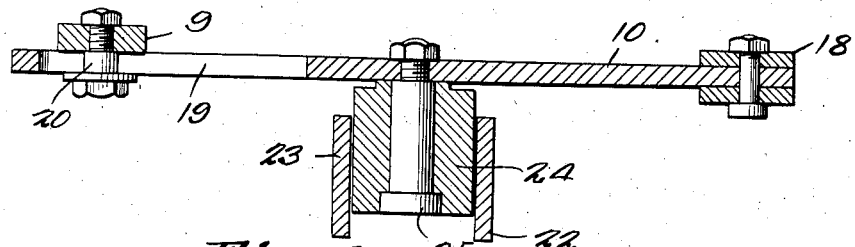
Inventor
R. V. Wallace Jan. 24, 1939.  R. V. WALLACE  2,144,905
ATTACHMENT FOR HARVESTER REELS
Filed May 21, 1937    2 Sheets-Sheet 2

Inventor
*R. V. Wallace*

By *C. A. Snow & Co.*
Attorneys.

Patented Jan. 24, 1939

2,144,905

UNITED STATES PATENT OFFICE 2,144,905

ATTACHMENT FOR HARVESTER REELS

Robert V. Wallace, Cheney, Wash.

Application May 21, 1937, Serial No. 144,054

3 Claims. (Cl. 56—226)

This invention relates to agricultural machines, and more particularly to agricultural machines known as combined harvesters and threshing machines.

The primary object of the invention is to provide means on the reel of the machine for picking up the grain, so that the grain may be readily cut by the knives of the machine, as the machine is moved over the surface from which the grain is being harvested.

Another object of the invention is to provide a device of this character including teeth carried by the reel, the teeth being pivotally mounted on the reel so that as the reel is rotating, the teeth will pick up the grain at a point adjacent to the knives, whereupon the teeth will swing clear of the knives to positions to release the grain and deposit the grain on the draper, forming a part of the machine.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view disclosing a reel constructed in accordance with the invention as mounted on a combine or harvester.

Figure 4 is a sectional view taken on line 4—4 of Figure 1.

Figure 2:
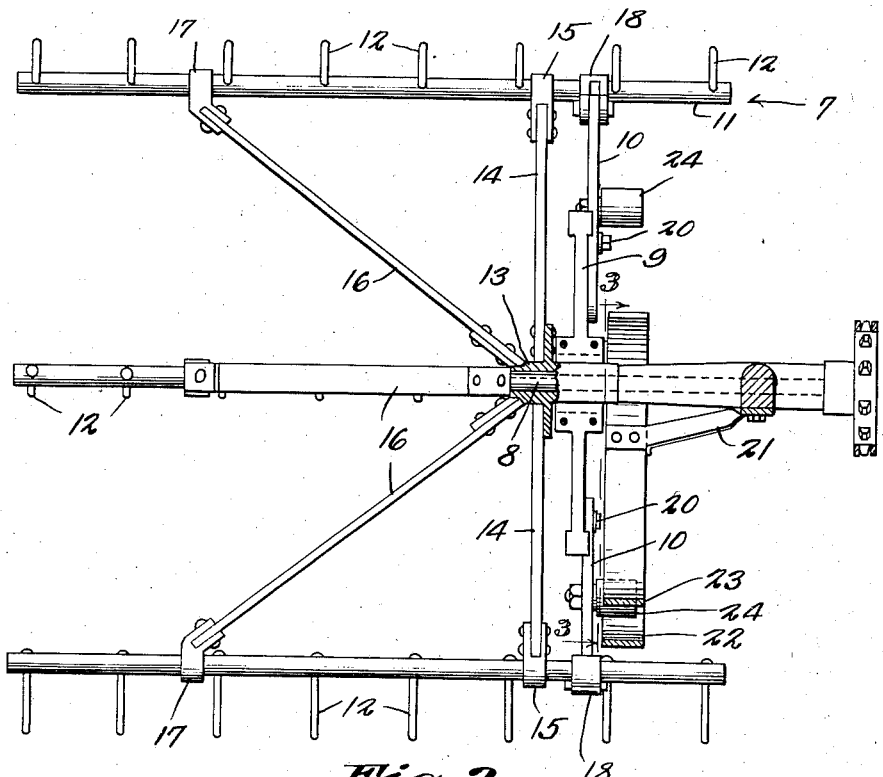
Figure 2 is a front elevational view of the reel.
Figure 3:
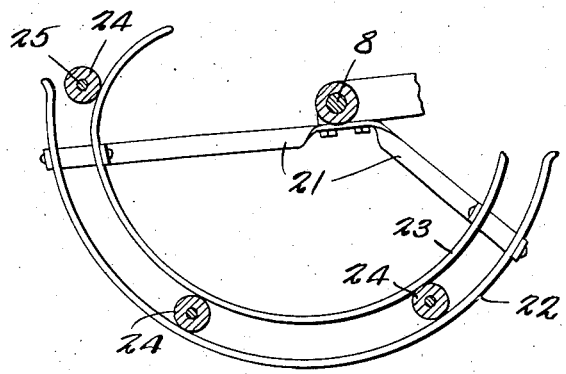
Figure 3 is a sectional view taken on line 3—3 of Figure 2 and illustrating the cams employed in operating the pivoted teeth of the reel.

Referring to the drawings in detail, the reference character 5 designates the front end of the usual harvester or combine, which is supplied with the usual cutter bar 6.

The reel forming the subject matter of the present invention, is indicated generally by the reference character 7, and is mounted on the shaft 8 supported and operated in the usual and well known manner.

The reel 8 comprises the circular supporting section 9, which provides a support for the arms 10 to be hereinafter more fully described, and which operate the pivoted bars 11 on which the teeth 12 of the reel, are mounted.

The reference character 13 designates a bearing to which the arms 14 are connected, the arms having bearings 15 at their outer ends, in which the pivoted bars 11 are mounted.

Angularly disposed bars 16 are also connected with the bearing 13, and extend to positions near the free ends of the bars 11, where they support the bearings 17, which support the pivoted bars 11. Secured to the pivoted bars 11, are arms 18, to which the outer ends of the arms 10 are pivotally connected, so that movement of the arms 10 will produce a relative movement of the arms 18, to move the bars 11 in their bearings, to accomplish the purpose of the invention.

As clearly shown by Figure 1 of the drawings, these bars 10 are provided with elongated openings 19 that accommodate the headed pins 20 that are secured to the circular supporting member 9, whereby the arms 10 may slide freely with respect to the circular supporting member 9.

The reference character 21 designates supporting arms which are secured to the frame of the machine, and extend inwardly to a position adjacent to the circular supporting member 9, where they support the cam members 22 and 23, which are arranged in spaced relation with each other, as clearly shown by Figure 1, the construction of the cam members being such that they will feed the rollers 24, mounted on the shaft 25, which in turn are secured to the arms 10, between the cam members 22 and 23.

It might be further stated that these cam members are so arranged that as the rollers 24 move therebetween, the arms 10 will move to positions to cause the teeth 12 to take positions in substantially parallel relation with the arms 10, throughout a portion of the cycle of rotation with the result that the grain which has blown down, will be picked up by the teeth and carried into the cutter bar. It follows that as the reel continues to rotate, the teeth will gradually move forwardly, releasing the grain and dropping the grain on the draper forming a part of the machine.

Having thus described the invention, what is claimed is:

1. In a reel for harvesting machines having cutter bars, arms radiating from the hub of the reel, pivoted bars mounted at the outer ends of the arms, slidable bars mounted on the reel, said bars having elongated openings formed near the inner ends thereof, headed pins on the reel and disposed within the elongated openings, arms connecting the slidable bars and pivoted bars, stationary cam members mounted on the machine at a point near the reel, rollers on the slidable bars and movable over the cam members for moving the slidable bars, and teeth on the pivoted bars adapted to rake material into the cutter bar of the machine.

2. In a reel for harvesting machines having cutter bars, arms radiating from the hub of the reel and terminating an appreciable distance beyond the reel, substantially horizontal rotary bars mounted at the outer ends of the arms, slidable bars mounted on the reel, arms connected to the rotary bars, said slidable bars being connected to the last mentioned arms, said bars having elongated openings near the inner ends of the said slidable bars, rollers extending laterally from the slidable bars and disposed intermediate the ends of the slidable bars, cam members mounted on the frame of the machine, said rollers operating over the cam members operating the slidable bars, and teeth on the rotary bars for raking the grain harvested into the knives of the cutter bar.

3. In a reel for harvesting machines having cutter bars, arms extending from the hub of the reel, horizontal bars pivotally mounted at the outer ends of the arms, teeth extending from the horizontal bars, operating bars slidably mounted on the arms, means for transmitting movement of the operating bars to the horizontal bars whereby the teeth are moved into raking position, raking grain into the knives of the machine as the reel operates, rollers extending laterally from the bars, at points intermediate the ends of the bars, and cam members supported adjacent to the reel and over which the rollers move operating the bars.

ROBERT V. WALLACE.